United States Patent [19]

Kao et al.

[11] Patent Number: 5,855,666
[45] Date of Patent: *Jan. 5, 1999

[54] PROCESS FOR PREPARING ENVIRONMENTALLY STABLE PRODUCTS BY THE REMEDIATION OF CONTAMINATED SEDIMENTS AND SOILS

[75] Inventors: Richard L. Kao, Naperville; Sarabjit S. Randhava; Surjit S. Randhava, both of Evanston; Michael C. Mensinger; Amirali G. Rehmat, both of Darien; Anthony L. Lee, Glen Ellyn, all of Ill.

[73] Assignee: Cement-Lock Group, L.L.C., DesPlaines, Ill.

[*] Notice: This patent issued on a continued prosecution application filed under 37 CFR 1.53(d), and is subject to the twenty year patent term provisions of 35 U.S.C. 154(a)(2).

[21] Appl. No.: 773,677

[22] Filed: Dec. 24, 1996

[51] Int. Cl.$^6$ .................................................. C04B 18/04
[52] U.S. Cl. ........................ 106/718; 106/721; 106/737; 106/745; 106/900; 501/11; 588/252; 588/257
[58] Field of Search ................................ 501/11; 588/19, 588/252, 257; 106/900, 745, 705, 706, 718, 721, 737; 405/128, 258, 270

[56] References Cited

U.S. PATENT DOCUMENTS

| | | | |
|---|---|---|---|
| 3,332,490 | 7/1967 | Burtch et al. | 106/900 |
| 4,348,340 | 9/1982 | Gagneraud | 264/8 |
| 4,388,117 | 6/1983 | Wilson, Sr. | 106/100 |
| 4,602,574 | 7/1986 | Bach et al. | 588/201 |
| 4,627,877 | 12/1986 | Ogawa et al. | 106/100 |
| 4,666,490 | 5/1987 | Drake | 588/205 |
| 4,668,300 | 5/1987 | Miller | 106/314 |
| 4,764,487 | 8/1988 | Lewis | 501/70 |
| 5,177,304 | 1/1993 | Nagel | 588/201 |
| 5,177,305 | 1/1993 | Pichat | 588/257 |

(List continued on next page.)

OTHER PUBLICATIONS

"Aggregates for construction from vitrified charmin contaminated soils" Meegooda et al., (1996) vol. 1 pp. 405–414 Environ Geotech Proc. Int '1 Symp. 3$^{rd}$.

"Plasma Treatment of INEL soil contaminated w. heavy metals" Deteing et al. (1992) Energy Res. abstr. (1992) 17(7).

*Primary Examiner*—Paul Marcantoni
*Attorney, Agent, or Firm*—Welsh & Katz, Ltd.

[57] ABSTRACT

This invention relates to thermo-chemical remediation and decontamination of sediments and soils contaminated with organic contaminants as well as inorganic materials with subsequent beneficial reuse. Novel environmentally stable products of commercial value are produced when certain additives such as calcium and metal oxides are mixed with the contaminated materials. In the process, the mixture is heated to 1150° C.~1500° C. to produce a molten reaction product with at least part of an excess amount of oxygen mixture or air is continuously bubbled through the melt in order to provide mixing and achieve high thermal destruction and removal efficiencies of the organic contaminants. The melt is then quickly quenched in moist air, steam, or water to avoid the transformation of the amorphous material into crystals. The inorganic contaminants such as chromium, nickel, zinc, etc. are incorporated and completely immobilized within the amorphous silicate network. Atmospheric emissions resulting from this process are nontoxic and capable of meeting currently specified health and environmental requirements.

The amorphous material can be pulverized to yield a powder which evinces cementitious properties either by reaction with alkali solution or by blending it with other materials to produce blended cements. The compressive strengths of the concretes made from the powder of the subject invention and blends thereof are comparable to, or greater than the ASTM requirements for general purpose concrete applications. The powder of the subject invention, blended cements, and concrete/mortar derived therefrom also easily pass the EPA TCLP leach test to achieve environmental acceptability.

11 Claims, 10 Drawing Sheets

U.S. PATENT DOCUMENTS

| | | | |
|---|---|---|---|
| 5,180,421 | 1/1993 | Rostoker et al. | 75/414 |
| 5,191,154 | 3/1993 | Nagel | 588/201 |
| 5,202,100 | 4/1993 | Nagel et al. | 423/5 |
| 5,253,991 | 10/1993 | Yokota et al. | 425/6 |
| 5,264,654 | 11/1993 | Kreft et al. | 588/205 |
| 5,273,567 | 12/1993 | Richards | 65/134 |
| 5,301,620 | 4/1994 | Nagel et al. | 110/346 |
| 5,304,708 | 4/1994 | Buehler | 588/256 |
| 5,322,547 | 6/1994 | Nagel et al. | 75/414 |
| 5,324,341 | 6/1994 | Nagel et al | 75/503 |
| 5,358,549 | 10/1994 | Nagel et al. | 75/414 |
| 5,358,697 | 10/1994 | Nagel | 422/184 |
| 5,395,405 | 3/1995 | Nagel et al. | 48/197 |
| 5,424,042 | 6/1995 | Mason et al. | 588/256 X |
| 5,435,982 | 7/1995 | Wilkinson | 423/437 |
| 5,436,210 | 7/1995 | Wilkinson et al. | 588/201 |
| 5,443,572 | 8/1995 | Wilkinson et al. | 266/46 |
| 5,462,570 | 10/1995 | Balcar et al. | 588/256 X |
| 5,489,734 | 2/1996 | Nagel et al. | 588/1 |
| 5,491,279 | 2/1996 | Robert et al. | 588/201 |
| 5,505,143 | 4/1996 | Nagel | 110/204 |
| 5,540,771 | 7/1996 | Hata et al. | 106/697 |
| 5,611,766 | 3/1997 | Carle et al. | 588/252 |
| 5,662,579 | 9/1997 | Bickford | 588/256 |
| 5,714,002 | 2/1998 | Styron . | |
| 5,714,003 | 2/1998 | Styron . | |

* CONTAMINATED FEED INCLUDES CONTAMINATED SEDIMENTS AND SOILS

** CORRECTIVE COMPONENT INCLUDES ALUMINA/BAUXITE/FERRIC OXDE/FLUXING AGENT

* CONTAMINATED FEED INCLUDES CONTAMINATED SEDIMENTS AND SOILS

** CORRECTIVE COMPONENT INCLUDES ALUMINA/BAUXITE/FERRIC OXDE/FLUXING AGENT

\* CONTAMINATED FEED INCLUDES CONTAMINATED SEDIMENTS AND SOILS

\*\* CORRECTIVE COMPONENT INCLUDES ALUMINA/BAUXITE/FERRIC OXDE/FLUXING AGENT

PROCESS FOR PREPARING ENVIRONMENTALLY STABLE PRODUCTS BY THE REMEDIATION OF CONTAMINATED SEDIMENTS AND SOILS

FIELD OF THE INVENTION

This invention relates to thermo-chemical remediation and decontamination of sediments and soils contaminated with various organic and inorganic compounds. Novel environmentally stable products are generated in conjunction with the remediation process when additives such as calcium and metal oxides are added to the contaminated materials.

BACKGROUND OF THE INVENTION

All types of man-made contaminated materials that pollute our environment are generated worldwide. These contaminants are found in air, water, river sediments, manufactured town gas sites, etc. There are two general types of contaminants: organic and inorganic. The most prevalent organic contaminants associated with sediments and soils include: Polynuclear aromatic hydrocarbons (PAHs), chlorinated hydrocarbons such as polychlorinated biphenyls (PCBs), dioxins, furans, etc. and fossil-fuel derived hydrocarbons and their derivatives. The most common inorganic contaminants include volatile and nonvolatile heavy metals and mineral-derived materials such as asbestos.

Current thermal methods for the treatment of the above waste materials include the following four treatment systems: vitrification, plasma processing, molten metal processing and steam reforming. None of these methods have proven sufficiently economical for large-scale decontamination applications. In addition, after treatment, these technologies generate large secondary, waste streams that require expensive disposal.

This invention teaches a novel thermo-chemical transformation of contaminated sediments and soils into useful products for general construction applications, namely, blended cements and thus can significantly improve remediation economics by creating such value-added end products.

SUMMARY OF THE INVENTION

The principal benefit of the present invention is to provide an economical method for remediating sediments and soils contaminated with organic as well as inorganic contaminants by:

a) ensuring high thermal destruction (99.99% or more) of organic contaminants present in the sediments and soils by converting the contaminants into nonhazardous compounds, such as $CO_2$, $H_2O$ and $CaCl_2$;

b) providing a process for incorporating and immobilizing inorganic contaminants such as heavy metals in an amorphous leach-resistant silicate network;

c) transforming the contaminated sediments and soils into useful construction products.

Another advantage of the invention is the ability to impart specific desirable reactivity properties to decontaminated sediments and soils by reaction with appropriate amounts of limestone, alumina, ferric oxides and fluxing agent during the melting stage in the presence of excess oxygen or oxygen-containing gas.

An additional advantage of the invention is a new waste management treatment technology to replace landfill and incineration methods.

These, and other benefits and advantages, are embodied in the subject invention which relates to a novel process for the remediation of hazardous materials comprised of sediments and soils which are contaminated by organic contaminants such as PAHs, PCBs, dioxins, furans, etc. and inorganic contaminants such as volatile and nonvolatile heavy metals. The organic contaminants are volatilized from the contaminated sediments and soils due to the elevated temperatures, 1150° C. to 1500° C., encountered in the subject process. The volatilized organic contaminants are thermally destroyed with destruction and removal efficiencies exceeding 99.99 percent by reaction with the excess oxygen present in the reaction chamber. The organic contaminant-depleted sediments and soils then further react with proper amounts of limestone, alumina, ferric oxides and other suitable additives which are added to the contaminated mixture to produce an amorphous molten reaction product within which the inorganic contaminants and heavy metal cations such as lead, cadmium, arsenic, barium, chromium, mercury, selenium, silver, etc. in the form of their stable oxides are incorporated and immobilized in the silicate network. The molten reaction product is quickly quenched in moist air, steam or water to ambient temperature to avoid the transformation of the amorphous material into crystals and thus enhance the possibilities for the heavy metal cations to become incorporated in the amorphous non-crystalline material. The quenched melt is then pulverized to yield the reactive melt of the subject invention.

Thus, the process of the subject invention includes the thermo-chemical remediation and decontamination of sediments and soils contaminated with organic contaminants as well as inorganic contaminants and comprises the steps of: combining the contaminated sediments or soils with a mixture of calcium oxide source, alumina, ferric oxides and fluxing agent; heating the mixture to produce a molten reaction product; bubbling oxygen through the melt for destruction of the organic contaminants; quenching the melt in the presence of moist air, steam, or water to form an amorphous material; pulverizing the amorphous material to form a powder; and blending the powder with a cement to yield a blended cement. The product of the subject invention comprises the reactive melt product of claim 2, further including magnesia (MgO), alkalis ($Na_2O$ and $K_2O$), sulfur trioxide ($SO_3$) present as gypsum, phosphorus oxide ($P_2O_5$), titanium oxide ($TiO_2$) and strontium oxide (SrO).

DETAILED DESCRIPTION OF THE DRAWINGS

A process of the present invention involves introducing raw feed materials such as contaminated sediments and soils, lime, metal oxides and fluxing agents that contain chemical compounds necessary for the production of reactive melt into a furnace in proper proportions, more specifically, the process of the subject invention includes the thermo-chemical remediation and decontamination of sediments and soils contaminated with organic contaminants as well as inorganic contaminants and comprises the steps of: combining the contaminated sediments or soils with a mixture of calcium oxide source, alumina, ferric oxides and fluxing agent; heating the mixture to produce a molten reaction product; bubbling oxygen through the melt for destruction of the organic contaminants; quenching the melt in the presence of moist air, steam, or water to form an amorphous material; pulverizing the amorphous material to form a powder; and blending the powder with a cement to yield a blended cement.

Exemplary reactive melt may be found when a sediment (Table 1) remediated by the process contains about 20 to about 40 weight percent lime (CaO), about 45 to about 65 weight percent silica (SiO), about 5 to about 20 weight percent alumina ($Al_2O_3$), about 2 to about 10 weight percent ferric oxide ($Fe_2O_3$), about 0.1 to about 5 weight percent sulfur trioxide ($SO_3$) present as gypsum, about 1 to about 3 weight percent magnesia (MgO), about 0.1 to about 5 weight percent alkalis ($Na_2O$ and $K_2O$), and about 0 to 5 weight percent fluxing agent. The properties of the resulting reactive melt may be modified through combination with a portland cement.

Figure 1:
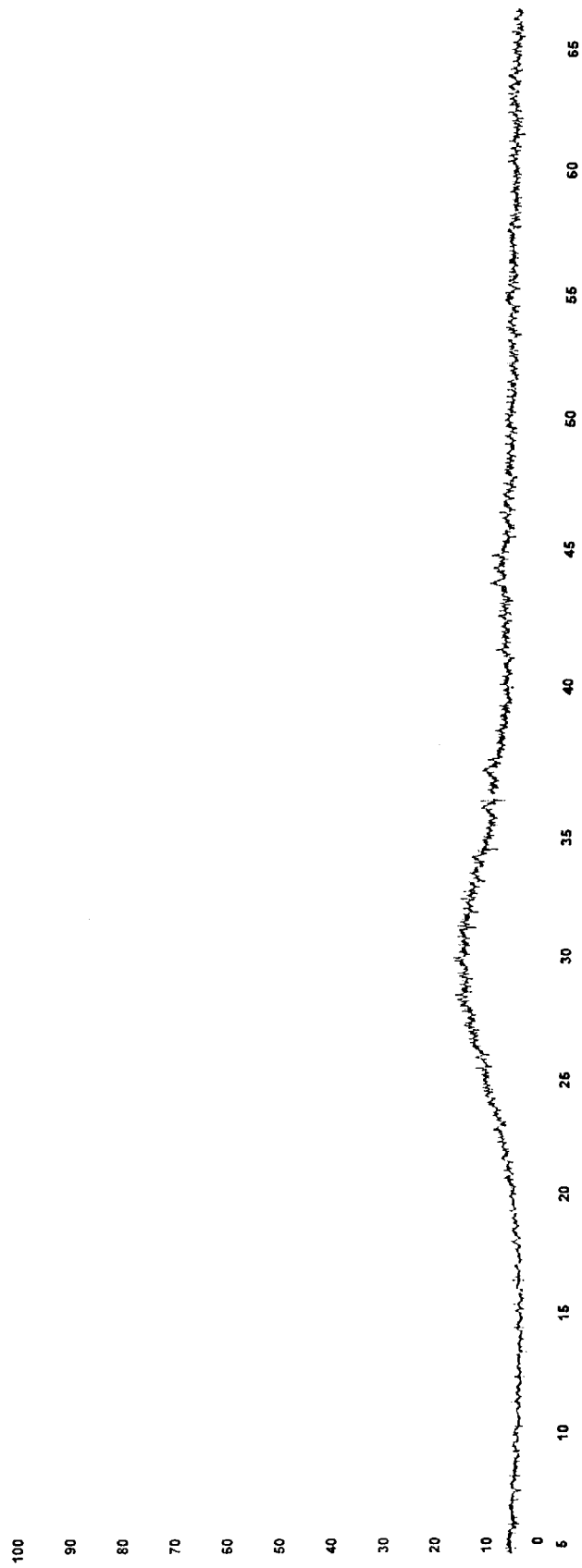
FIG. 1 is an x-ray diffraction graph of the subject invention.
Figure 2:
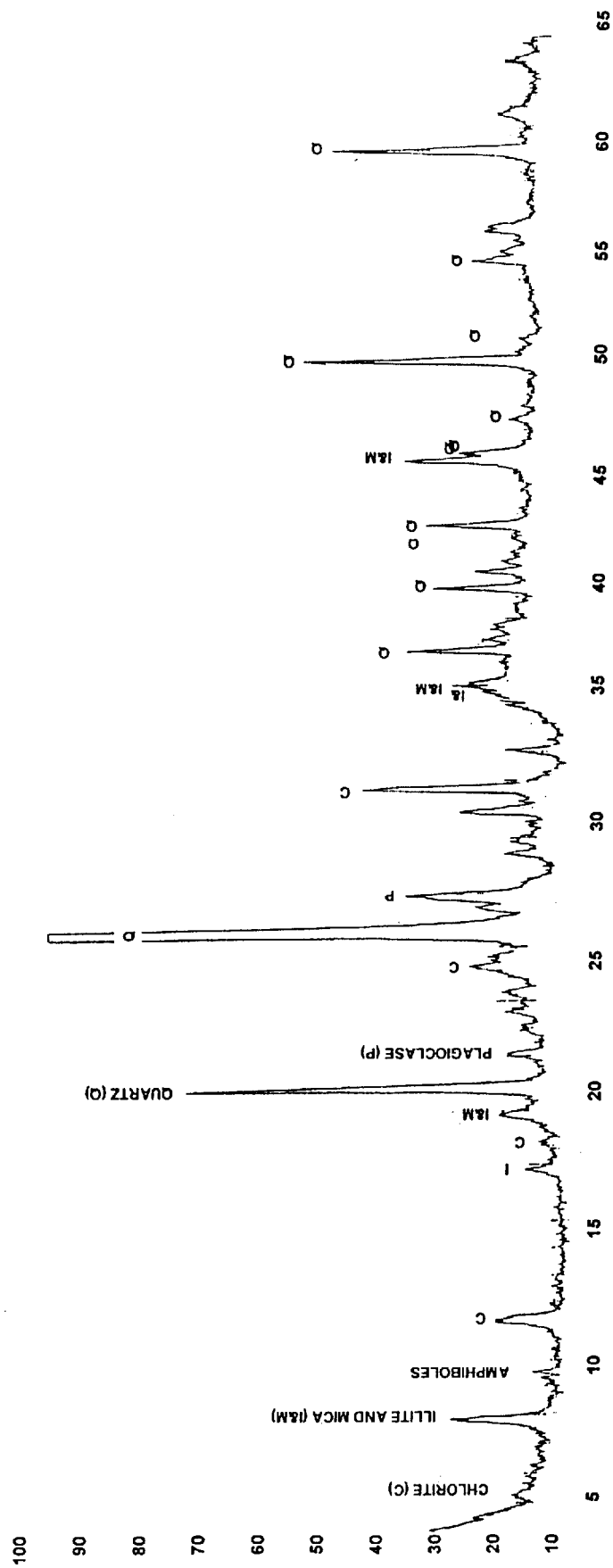
FIG. 2 is an x-ray diffraction graph of the sediment from which the reactive melt of FIG. 1 was prepared.
Figure 3:
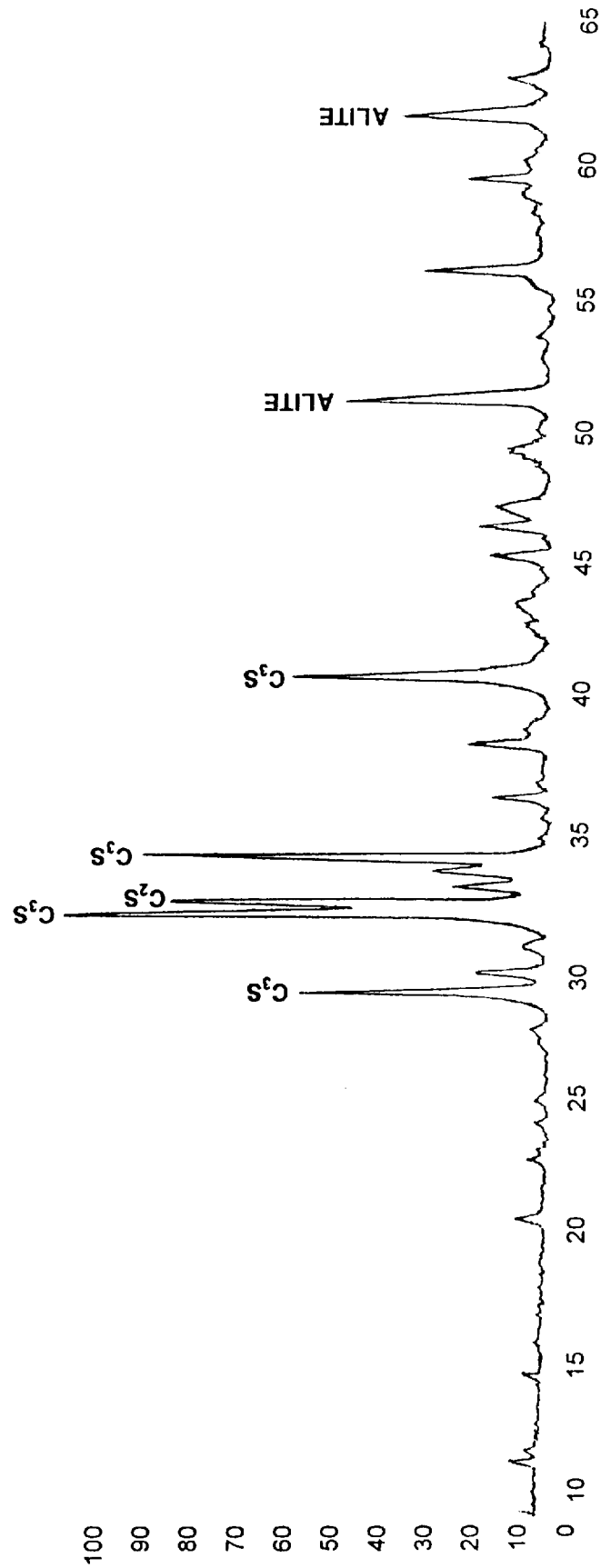
FIG. 3 is an x-ray diffraction graph of commercial portland cement.
Figure 4:
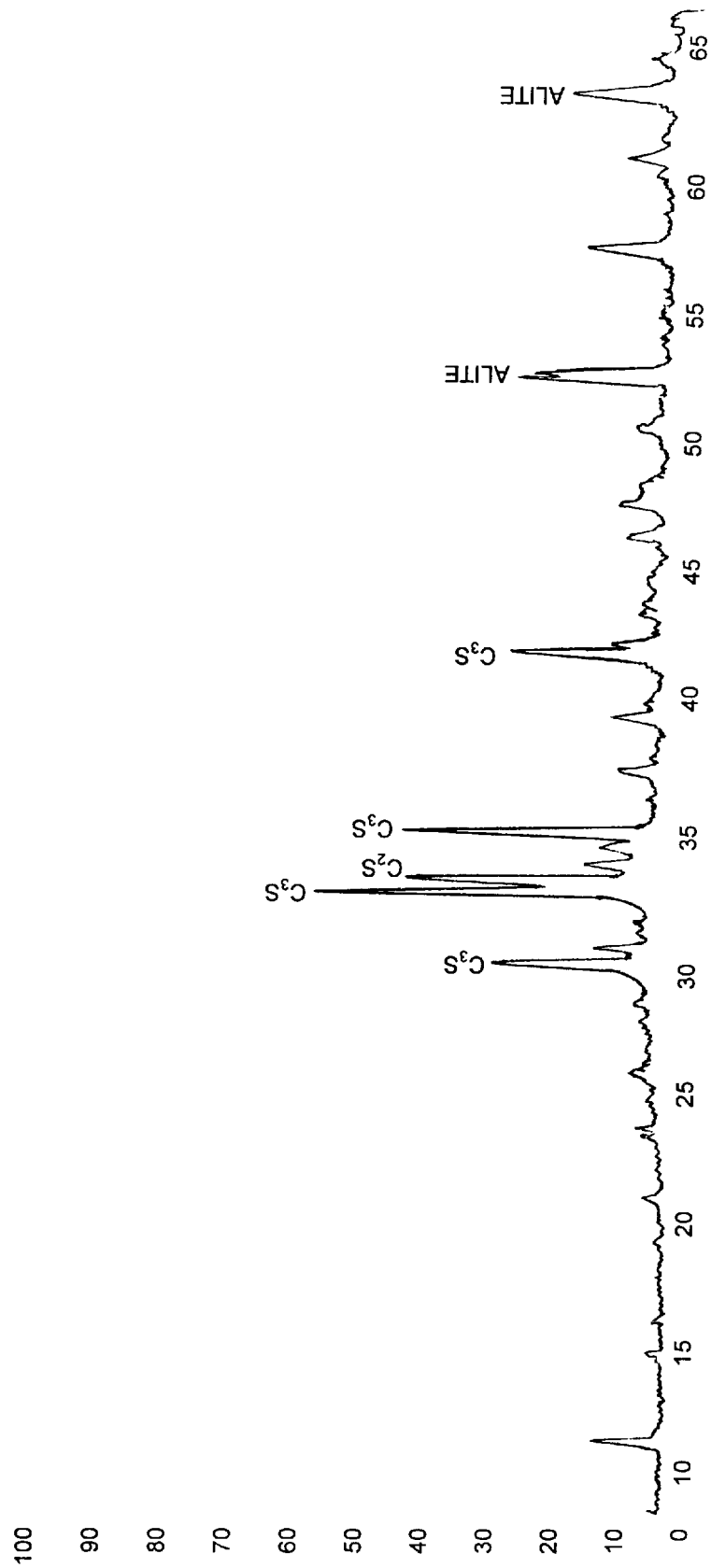
FIG. 4 is an x-ray diffraction graph of a blended cement produced from 40 wt % reactive melt and 60 wt % type I portland cement.
Figure 5:
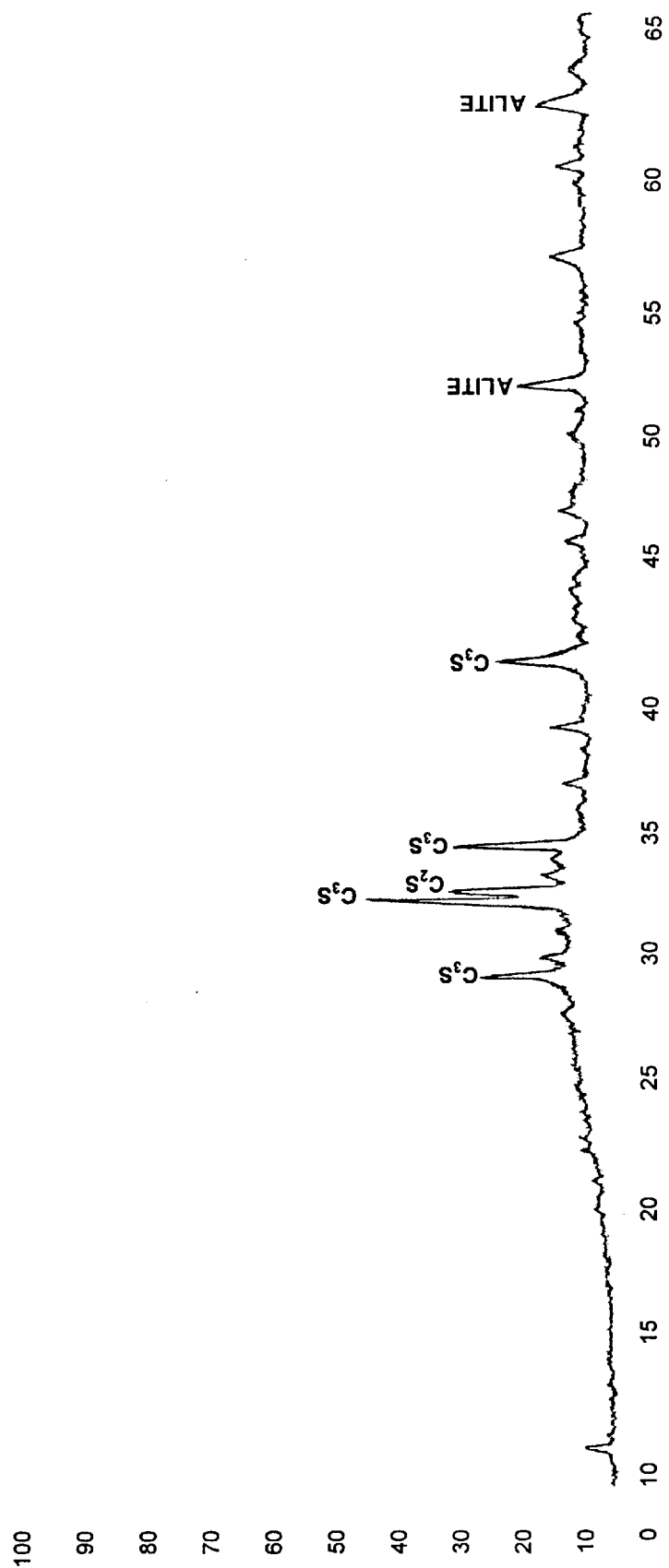
FIG. 5 is an x-ray diffraction graph of a blended cement produced from 70 wt % reactive melt and 30 wt % type I portland cement.

The amorphous nature of the reactive melt has been confirmed by either using an optical microscope with transmitted light or subjecting it to the x-ray diffraction (XRD) technique to verify the composition of this product (FIG. 1). FIG. 1 shows no peaks that would indicate the presence of crystal structures. It is completely different from the XRD pattern of either the original contaminated sediments (FIG. 2) with major peaks of quartz, chlorite, illite and mica (as indicated on the figure), or commercial portland cement with major peaks of $C_2S$, $C_3S$ and alite as shown in FIG. 3, or blended cements (40:60 and 70:30 weight percent blends of reactive melt and portland cement) with somewhat smaller peaks due to dilution of the portland cement component by the amorphous reactive melt (FIGS. 4 and 5, respectively).

One product (reactive melt) thus formed when a sediment or soil (major mineral elemental oxide component of samples of sediment from Newtown Creek of New York and a Superfund site soil from Illinois are shown in Table 1) has been remediated is reactive in nature and its chemical composition may be generally stated as:

| | |
|---|---|
| Calcium Oxide (CaO) | 20 to 40 wt % |
| Silica ($SiO_2$) | 45 to 65 wt % |
| Alumina ($Al_2O_3$) | 5 to 20 wt % |
| Ferric Oxide ($Fe_2O_3$) | 2 to 10 wt % |
| Fluxing Agent | 0 to 5 wt % |

TABLE 1

MAJOR MINERAL COMPOSITION OF SEDIMENT

| Component | Sediment | Soil |
|---|---|---|
| | wt % | |
| $SiO_2$ | 51.33 | 65.07 |
| $Al_2O_3$ | 10.58 | 5.35 |
| $Fe_2O_3$ | 6.26 | 2.96 |
| CaO | 2.03 | 7.38 |
| MgO | 2.11 | 4.18 |
| $SO_3$ | 0.41 | 0.29 |
| $Na_2O$ | 2.77 | 0.54 |
| $K_2O$ | 1.97 | 1.52 |
| $TiO_2$ | 0.72 | 0.28 |
| $P_2O_5$ | 0.54 | 0.09 |
| $Mn_2O_3$ | 0.06 | 0.07 |
| SrO | 0.03 | 0.03 |
| Loss On Ignition (950° C.) | 20.43 | 12.24 |
| Other (By Difference) | 0.76 | 0.00 |
| TOTAL | 100.00 | 100.00 |

Other minor chemical composition of the reactive melt includes magnesia (MgO), alkalies ($Na_2O$ and $K_2O$), sulfur trioxide ($SO_3$) present as gypsum, halogens present as halogenated inorganics, phosphorus oxide ($P_2O_5$), titanium oxide ($TiO_2$), strontium oxide (SrO) etc. and heavy metals. The melting point of the reactive melt bounded by the above chemical composition is between the temperatures of about 1150° C. to about 1400° C.

The comminuted reactive melt evinces cementitious properties either by reaction with aqueous alkaline solution (Example I) or by blending it with materials such as portland cement (Examples II and III). The weight ratio of reactive melt to portland cement for the production of construction grade blended cements ranges from 10 parts of reactive melt to 90 parts of portland cement up to 70 parts of reactive melt to 30 parts of portland cement.

In the molten phase, silica ($SiO_2$) by itself and in chemical combination with other oxides such as alumina ($Al_2O_3$), ferric oxide ($Fe_2O_3$), sodium oxide ($Na_2O$), lime (CaO) etc. forms a silicate network that incorporates heavy metal atoms. The amount of a specified heavy metal that can be incorporated in the silicate network depends on the similarity of that heavy metal to other atoms already present in the network. The elemental substitution can be estimated by the comparison of "indices of ionic replacement" calculated from the electrovalency, ionic radius, coordination number and electronic configuration of the cations (Jack Green, "Geochemical Table of the Elements," *Bulletin of the Geological Society of America*, Vol. 70, pp. 1127–1184, September 1959). The indices of ionic replacement of all cations of concern are present in Table 2.

TABLE 2

INDICES OF IONIC REPLACEMENT

| | | | | | |
|---|---|---|---|---|---|
| $K^+$ | 0.03 | $Fe^{+2}$ | 0.14 | $Fe^{+3}$ | 0.22 |
| $Ag^+$ | 0.04 | $Cu^{+2}$ | 0.14 | $W^{+4}$ | 0.28 |
| $Na^+$ | 0.06 | $Sn^{+2}$ | 0.14 | $Mo^{+4}$ | 0.28 |
| $Ba^{+2}$ | 0.07 | $Ni^{+2}$ | 0.14 | $Ti^{+4}$ | 0.28 |
| $Pb^{+2}$ | 0.08 | $Mg^{+2}$ | 0.14 | $Se^{+4}$ | 0.31 |
| $Sr^{+2}$ | 0.08 | $U^{+4}$ | d.19 | $Al^{+3}$ | 0.35 |
| $Ca^{+2}$ | 0.09 | $Zr^{+4}$ | 0.20 | $Si^{+4}$ | 0.48 |
| $Cd^{+2}$ | 0.09 | $Mn^{+3}$ | 0.21 | $Se^{+6}$ | 0.49 |

TABLE 2-continued

INDICES OF IONIC REPLACEMENT

| $Hg^{+2}$ | 0.12 | $Cr^{+3}$ | 0.22 | $As^{+5}$ | 0.60 |
| $Mn^{+2}$ | 0.13 | | | $P^{+5}$ | 0.62 |
| $Zn^{+2}$ | 0.14 | | | | |

Referring to Table 2, $Ag^+$, $Ba^{+2}$, $Pb^{+2}$, $Sr^{+2}$ and $Cd^{+2}$ tend to substitute for alkali metals; $Hg^{+2}$, $Mn^{+2}$, $Zn^{+2}$, $Cu^{+2}Sn^{+2}$ and $Ni^{+2}$ tend to substitute for $Mg^{+2}$ and $Fe^{+2}$; $Cr^{+3}$ tends to substitute for $Fe^{+3}$; and so on.

Rapidly cooling a melt causes distortion of the silicate network; at high cooling rates, the silicate network structure in the solidified melt becomes highly irregular and its molecules are frozen into disordered noncrystalline glass. When the network irregularity is high, the chances for the heavy metal cations having different indices of ionic replacement from other cations already present in the network to become incorporated are enhanced.

The stability of the solidified melt depends on the strength of its silicate network structure within which the heavy metal impurities are incorporated. This strength can be estimated by the calculating molar acidity of the melt, which is the molar ratio of the sum of the melt's acidic oxides to the sum of its basic oxides. Besides silica, other common acidic oxides in the melt are $Al_2O_3$, $TiO_2$, $Fe_2O_3$, $P_2O_5$, $Cr_2O_3$ and $ZrO_2$. Common basic oxides in the melt include CaO, MgO, $Na_2O$, $K_2O$, FeO, sulfide and chloride. If the molar acidity of the melt is high, the silicate network structure will be strong and the melt will be stable. For example, a typical Type I portland cement containing 21.3 wt % $SiO_2$, 5.3 wt % $Al_2O_3$, 2.3 wt % $Fe_2O_3$, 65.2 wt % CaO, 2.9 wt % MgO and 3.0 wt % $SO_3$ has a molar acidity of 0.33. A typical reactive melt has a molar acidity that ranges from about 1.0 to about 2.5, thus it is more environmentally stable than portland cement.

Small-scale leachability tests (per the Toxicity Characteristic Leaching Procedure, or TCLP) Anon. *Analyt. Control*, "TCLP: Improved Method," 12(1), 1–6, publ. bu NUS Corp., Pittsburgh, Pa., 1987. were utilized to confirm findings of this invention therefrom. The TCLP test results from reactive melt, blended cement, portland cement and their mortar specimens are present in Examples IV to VIII.

In order to demonstrate the metal incorporation aspects of the subject invention, chromium oxide ($Cr_2O_3$) was admixed with the raw materials used to produce samples of both reactive melt and portland cement. These are discussed in Examples IV and VI. The level of chromium in the reactive melt was determined to be about 1110 mg/kg (Table 5) and that of the portland cement was determined to be 307 mg/kg (Table 9). The leachability of each sample was determined per the TCLP test (pH adjusted); the results are presented in Tables 6 and 10. The chromium leached from the reactive melt at 0.94 mg/L. The chromium leached from the portland cement at 11.8 mg/L, which is well above the TCLP regulatory limit for chromium of 5 mg/L. Comparing the original chromium contents of each sample with their resulting leachabilities, shows that the reactive melt is roughly 45 times less leachable than the portland cement.

The blended cement product made from reactive melt has the characteristic of rapidly consuming hydrated lime [Ca(OH)$_2$] present in the portland cement component of the blended cement, when compared to the rate of disappearance of hydrated lime present in conventional portland cement. This significantly improves the durability of concrete or mortar prepared with blended cement from reactive melt by essentially eliminating harmful side reactions, such as the alkali-silica reaction (ASR). This is demonstrated and discussed in Example IX.

EXAMPLE I

One part of the ground reactive melt was mixed with 2.75 parts of sand and 0.484 part of 20 weight percent NaOH aqueous solution to produce a mortar. The mortar was cast as 5-cm (2-inch) cubes and cured under moist conditions at 55° C. for 23 hours. Thereafter, the samples were demolded and tested for compressive strength within an hour. A strength of 21.4 MPa (3100 psi) is reported as the hydraulic activity of the reactive melt. This indicated that the reactive melt is reactive and cementitious in nature. The procedure and mortar recipe are part of an ASTM (American Society for Testing and Materials) standard C-1073.

EXAMPLE II

Forty (40) weight percent of the finely ground (about 4000 cm$^2$/g) reactive melt was blended with sixty (60) weight percent of Type I portland cement to meet the Type IP/P blended cement specifications as per the ASTM standard C-595. It should be noted that performance enhancing additives were not added to the blend. One part of the blended cement was then mixed with 2.75 parts of sand and 0.484 part of deionized water as prescribed in ASTM standard C-109 procedure to produce mortars. The mortars were cast as 5-cm (2-inch) cubes and left overnight in a moist room at ambient temperature. Thereafter, the cubes were demolded and cured in saturated lime-water solution. The compressive strengths tested after 3, 7 and 28 days are comparable to, or greater than the ASTM required levels. The results presented in Table 3 are the average of three separate, compressive strength tests.

TABLE 3

COMPRESSIVE STRENGTHS OF TYPE IP/P BLENDED CEMENT PRODUCED FROM 40 WT % REACTIVE MELT AND 60 WT % TYPE I PORTLAND CEMENT

| TEST PERIOD | TYPE IPIP REACTIVE MELT:PORTLAND CEMENT = 40:60 | ASTM RANGE FOR TYPE IP/P | ASTM FOR TYPE I** |
|---|---|---|---|
| | MPa (psi) | | |
| 3-day | 13.44 (1950) | 12.5 (1810) (for Type IP only) | 12.0 (1740) |
| 7-day | 18.82 (2730) | 10.4–19.4* (1510–2810) | 19.0 (2760) |
| 28-day | 31.85 (4620) | 20.7–24.2* (3000–3510) | 28.0 (4060) |

*Lower values are ASTM requirements for Type P; higher values are for Type IP blended cements.
**For cross-comparison purposes, the strength requirement for general purpose Type I portland cement has also been included in Table 3 from ASTM standard C-150 (Tables 3 and 4).

EXAMPLE III

The mortar cubes were prepared according to the procedure of Example II without adding any performance enhancing additives except that seventy (70) weight percent of the finely ground reactive melt was blended with thirty (30) weight percent of Type I portland cement to produce modified Type P blended cement. Type P is blended cement for concrete construction where high strength at early age is not required. ASTM does not specify a 3-day compressive strength requirement for the modified Type P blended cement.

TABLE 4

COMPRESSIVE STRENGTHS OF MODIFIED TYPE P BLENDED CEMENT PRODUCED FROM 70% REACTIVE MELT AND 30% TYPE I PORTLAND CEMENT

| TEST PERIOD | MODIFIED TYPE P REACTIVE MELT:PORTLAND CEMENT - 70:30 | ASTM FOR TYPE P |
|---|---|---|
| 3-day | 6.21 (900) | Not Specified |
| 7-day | 10.41 (1510) | 10.4 (1510) |
| 28-day | 22.41 (3250) | 20.7 (3000) |

EXAMPLE IV

The metal analysis of a raw dredged sediment and reactive melt are presented in Table 5 and the results of Toxicity Characteristic Leaching Procedure (TCLP) tests on the reactive melt are presented in Table 6. The metal analysis of the reactive melt leachate indicated that most of the metals are retained in the reactive melt silicate network due to the melting-reaction stages of the process. Some metals such as arsenic and mercury are volatilized during the thermal treatment and are captured downstream in the requisite air pollution control devices.

TABLE 5

METAL ANALYSIS OF RAW DREDGED SEDIMENT AND REACTIVE MELT

| Component | Raw Dredged Sediment | Cr-Dosed Reactive Melt |
|---|---|---|
| | mg/kg | |
| Arsenic | 33 | <5 |
| Barium | 192 | —* |
| Cadmium | 37 | <5 |
| Chromium | 377 | 1110 |
| Lead | 617 | 130 |
| Mercury | 1.3 | <5 |
| Selenium | <3.24** | <5 |
| Silver | 18 | <10 |

*Not analyzed
**< indicates below the analytical detection limit for the analyte

TABLE 6

METAL ANALYSIS OF REACTIVE MELT LEACHATE AND THE TCLP REGULATORY LIMIT

| Component | Cr-Dosed Reactive Melt Leachate | TCLP Regulatory Limit |
|---|---|---|
| | mg/L | |
| Arsenic | <0.1* | 5 |
| Barium | <0.5 | 100 |
| Cadmium | <0.01 | 1 |
| Chromium | 0.94 | 5 |
| Lead | <0.05 | 5 |
| Mercury | <0.001 | 0.2 |
| Selenium | <0.1 | 1 |
| Silver | <0.01 | 5 |

*< indicates below the analytical detection limit for the analyte

EXAMPLE V

The metal analyses were performed according to the procedure of Example IV except that a blended cement (reactive melt:portland cement=40 wt %:60 wt %) was used instead of reactive melt. The results are presented in Table 7. The results of leachability tests are presented in Table 8.

TABLE 7

METAL ANALYSIS OF RAW DREDGED SEDIMENT AND BLENDED CEMENT

| Component | Raw Dredged Sediment | Blended Cement |
|---|---|---|
| | mg/kg | |
| Arsenic | 33 | 9.22 |
| Barium | 192 | —* |
| Cadmium | 37 | 1.59 |
| Chromium | 377 | 480 |
| Lead | 617 | 35.8 |
| Mercury | 1.3 | <0.07 |
| Selenium | <3.24** | <0.94 |
| Silver | 18 | 2.66 |

*Not analyzed
**< indicates below the analytical detection limit for the analyte

TABLE 8

METAL ANALYSIS OF BLENDED CEMENT LEACHATE AND THE TCLP REGULATORY LIMIT

| Component | Blended Cement Leachate | TCLP Regulatory Limit |
|---|---|---|
| | mg/L | |
| Arsenic | <0.1* | 5 |
| Barium | <0.5 | 100 |
| Cadmium | <0.01 | 1 |
| Chromium | 0.2 | 5 |
| Lead | <0.05 | 5 |
| Mercury | <0.001 | 0.2 |
| Selenium | <0.1 | 1 |
| Silver | <0.01 | 5 |

*< indicates below the analytical detection limit for the analyte

EXAMPLE VI

The metal analyses were performed according to the procedure of Example IV except that a sample of portland cement was used instead of reactive melt. The results are presented in Table 9. The results of leachability tests are presented in Table 10.

TABLE 9

METAL ANALYSIS OF RAW DREDGED SEDIMENT AND PORTLAND CEMENT

| Component | Raw Dredged Sediment | Cr-Dosed Portland Cement |
|---|---|---|
| | mg/kg | |
| Arsenic | 33 | <2 |
| Barium | 192 | 51.6 |
| Cadmium | 37 | <5 |
| Chromium | 377 | 307 |
| Lead | 617 | 55 |
| Mercury | 1.3 | <5 |
| Selenium | <3.24* | <5 |
| Silver | 18 | <10 |

*< indicates below the analytical detection limit for the analyte

TABLE 10

METAL ANALYSIS OF PORTLAND CEMENT LEACHATE AND THE TCLP REGULATORY LIMIT

| Component | Cr-Dosed Portland Cement Leachate | TCLP Regulatory Limit |
|---|---|---|
| | mg/L | |
| Arsenic | <0.1* | 5 |
| Barium | <0.5 | 100 |
| Cadmium | <0.01 | 1 |
| Chromium | 11.8 | 5 |
| Lead | <0.05 | 5 |
| Mercury | <0.001 | 0.2 |
| Selenium | <0.1 | 1 |
| Silver | <0.01 | 5 |

*< indicates below the analytical detection limit for the analyte

EXAMPLE VII

Figure 6:
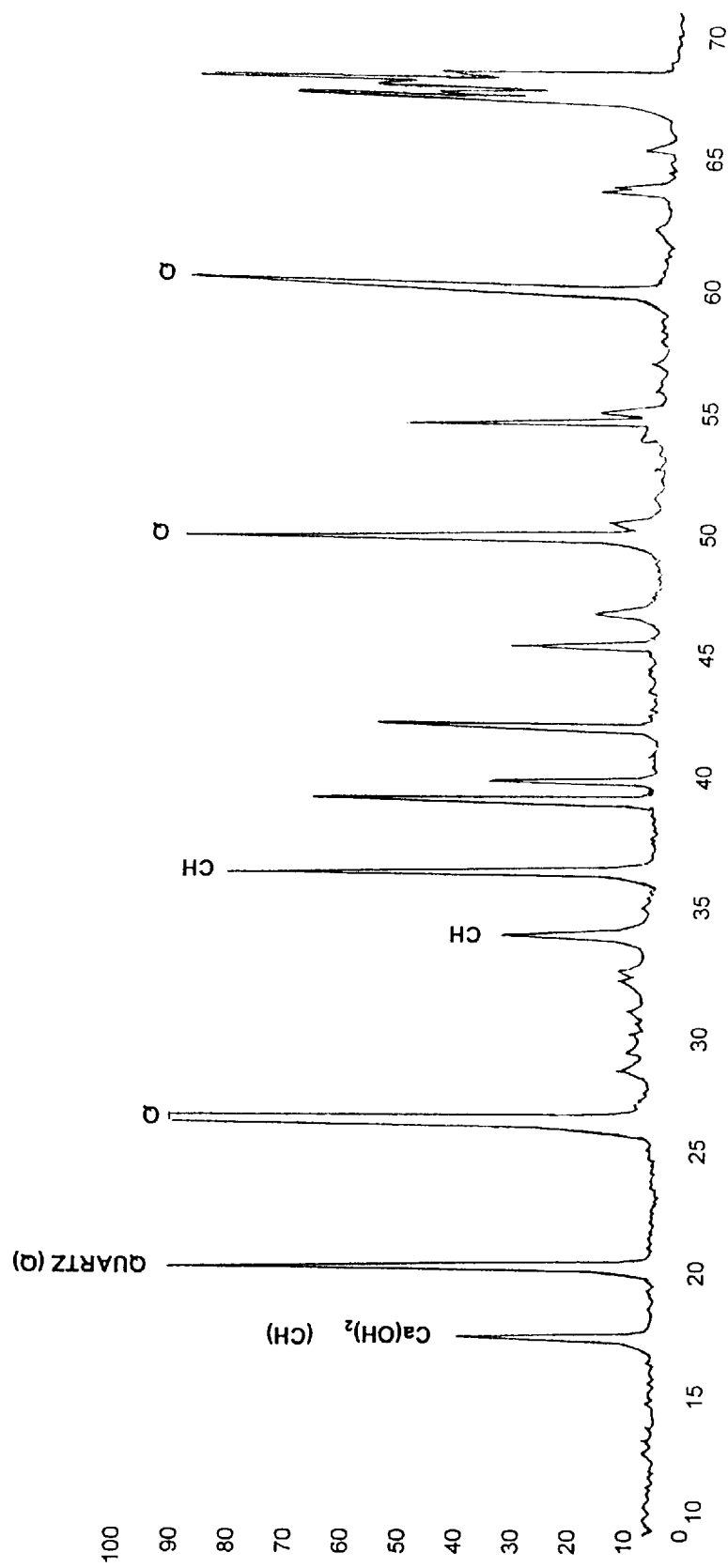
FIG. 6 is an x-ray diffraction graph of a commercial portland cement mortar.
Figure 7:
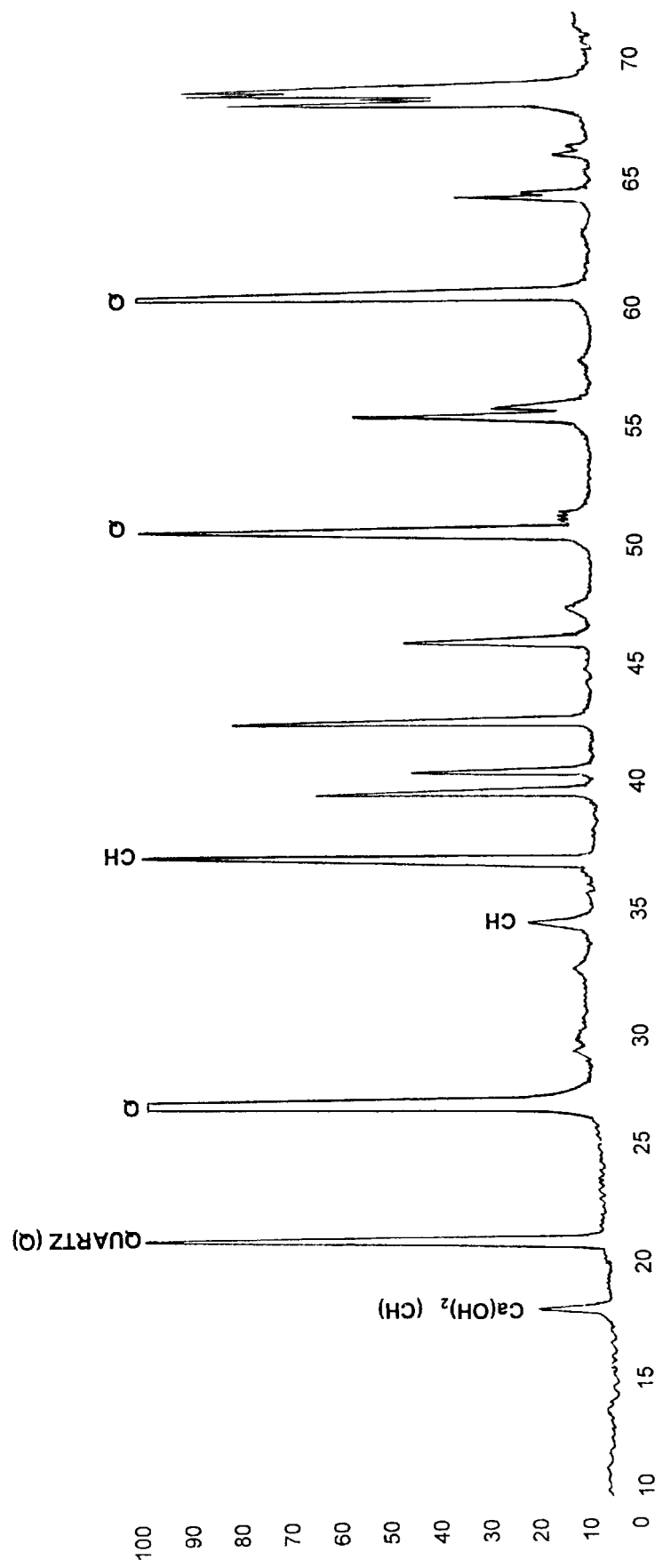
FIG. 7 is an x-ray diffraction graph of blended cement mortar.

Representative samples of portland cement mortar and blended cement mortar were analyzed by the x-ray diffraction (XRD) technique to verify the compound composition. The XRD results presented in FIGS. 6 and 7 compare the differences in the XRD patterns. Since mortar is comprised principally of silica sand, many of the major peaks exhibited are due to quartz and similar crystals.

EXAMPLE VIII

The metal analyses were performed according to the procedure of Example IV except that the reactive melt mortar specimen, the portland cement mortar specimen and the blended cement mortar specimen were used.

TABLE 11

METAL ANALYSIS OF REACTIVE MELT MORTAR SPECIMEN AND PORTLAND CEMENT MORTAR SPECIMEN

| Component | Cr-Dosed Reactive Melt Mortar | Cr-Dosed Portland Cement Mortar | Blended Cement Mortar |
|---|---|---|---|
| | mg/kg | | |
| Arsenic | 3.5 | <2 | <5 |
| Barium | 109 | 14.3 | 56.5 |
| Cadmium | <5 | <5 | <5 |
| Chromium | 435 | 146 | 145 |
| Lead | 17 | 16 | 13 |
| Mercury | <5 | <5 | <5 |
| Selenium | <5 | <5 | <5 |
| Silver | <10 | <10 | <10 |

*< indicates below the analytical detection limit for the analyte

TABLE 12

METAL ANALYSIS OF REACTIVE MELT MORTAR AND PORTLAND CEMENT MORTAR LEACHATES VERSUS THE TCLP REGULATORY LIMIT

| Component | Cr-Dosed Reactive Melt Mortar Leachate | Cr-Dosed Portland Cement Mortar Leachate | Blended Cement Mortar Leachate | TCLP Regulatory Limit |
|---|---|---|---|---|
| | mg/L | | | |
| Arsenic | <0.1* | <0.1 | <0.1 | 5 |
| Barium | <0.5 | <0.5 | <0.5 | 100 |
| Cadmium | <0.01 | <0.01 | <0.01 | 1 |
| Chromium | 1.4 | 3.6 | <0.1 | 5 |
| Lead | <0.05 | <0.05 | <0.05 | 5 |
| Mercury | <0.001 | <0.001 | <0.001 | 0.2 |
| Selenium | <0.01 | <0.1 | <0.1 | 1 |
| Silver | <0.01 | <0.01 | <0.01 | 5 |

*< indicates below the analytical detection limit for the analyte

EXAMPLE IX

The blended cement product made from reactive melt has the characteristic of rapidly consuming hydrated lime [Ca(OH)$_2$] present in the portland cement component of the blended cement, when compared to the rate of disappearance of hydrated lime present in conventional portland cement. This significantly improves the durability of concrete or mortar prepared with blended cement from reactive melt by essentially eliminating harmful side reactions, such as the alkali-silica reaction (ASR). In this example, paste prepared from either blended cement (from reactive melt) or samples of portland cement and water were analyzed by differential scanning calorimetry (DSC) to determine the disappearance of Ca(OH)$_2$ during the initial stages of curing from 3 to 28 days.

Other benefits and advantages of the subject invention will be understood by the following detailed description and the accompanying Process Flow Drawings, in which:

As stated, a process of the present invention involves introducing raw feed materials such as contaminated sediments and soils, lime, metal oxides and fluxing agents that contain chemical compounds necessary for the production of reactive melt into a melter in proper proportions.

The most common source of lime is limestone which contains primarily calcium carbonate ($CaCO_3$). When heated to about 900° C., this compound decomposes into lime (CaO) and carbon dioxide ($CO_2$), the latter which, being a gas, normally escapes from the process unaffected. Usually, the limestone is preheated prior to its introduction into the melter, not only to drive off the carbon dioxide, but to also place lesser energy demands on the melter as well. Other naturally occurring materials such as aragonite, chalk, marl, cement rock, shale and marine shells are equally suitable for use as a raw feed material in the process.

The raw feed materials also include a source of silica; excellent sources of silica are contaminated sediments and soils. The silica source can be introduced into the melt as fines, whether at ambient temperature, but preferably preheated.

The raw feed materials, in addition to including a source of lime and a source of silica, also include a source of alumina, a source of ferric oxide and a source of a fluxing agent such as calcium fluoride, although the amount of such materials that is useful is considerably less than the amount of lime or silica.

Other materials may appear in minor quantities in the reactive melt as noted before and may be also present in the various feed materials. These include compounds of alkalis (sodium and potassium) and of sulfur, titanium, magnesium, manganese, phosphorus, barium and strontium.

Within the melter, the feed materials combine and react chemically so that the formed melt, when withdrawn and quickly cooled, has appropriate proportions. Toxic metals such as lead and cadmium are incorporated and immobilized within the amorphous silicate network.

Figure 8:
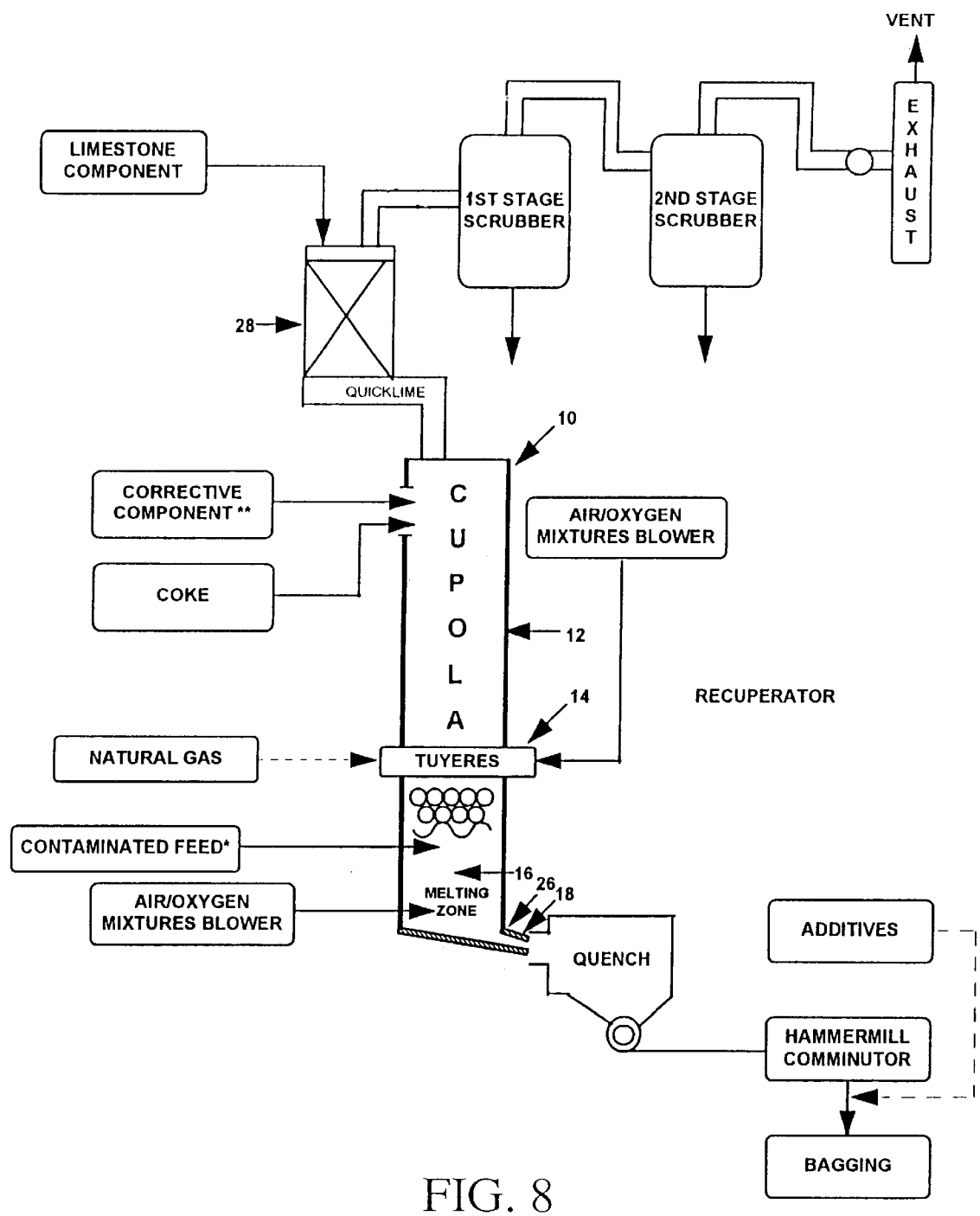
FIG. 8 is a schematic showing the manufacture of reactive melt by the subject invention using a cupola.

The melting, combining and reacting of the above feed material for the reactive melt manufacture can be carried out with a specially built cupola furnace (FIG. 8), a natural gas-fired melting furnace (FIG. 9), an electric melting furnace (FIG. 10), or other melting devices.

A cupola 10 is a vertical, cylindrical shaft furnace similar to a blast furnace and efficient conversion-melting is its principal function. Cupola 10 comprises a cylindrical water-cooled steel shell 12 lined with refractory materials, equipped with a windbox (winddrum, bustle, not shown) and water-cooled tuyeres 14 to provide for delivery and admission of air or oxygen mixtures into the shaft. At least part of the air or oxygen mixture supply is continuously bubbled through the melting zone located at the bottom of the cupola 10. Charging doors are provided at upper levels and holes or spouts 18 near the bottom allow the molten material to flow out.

The zone of oxygen disappearance in which the overall reaction $$C + O_2 \rightarrow CO_2$$

is predominant, is referred to as the oxidation zone or combustion zone.

$$C + O_2 \rightarrow CO_2 \Delta H = -94 \text{ kcal/mole}$$

Heat generated by the reaction in this zone accomplishes the melting process. The temperature of the melting zone 16 is maintained at about 1150° C. to 1500° C. The temperature of the combustion zone ranges from the melting temperature down to about 1000° C. The melting temperature can vary dependent principally on the materials comprising the reactive melt. The combustion zone also provides from about 0.5 to about 4 seconds residence time for flue gases to achieve high thermal destruction of organic contaminants.

Above the combustion zone is a heat transfer zone where the limestone decomposes to quicklime at about 870° C. to 1000° C. The quicklime also acts as a filter to trap particulates and entrained nonvolatile heavy metals from the melter flue gases. The heat transfer zone can comprise a separate piece of equipment, such as a vertical shaft kiln, if desired.

Above the heat transfer zone is a preheating zone which may be a separate piece of equipment 28, in its upper region. In the preheating zone a charge of limestone is heated to about 870° C. The off gases leave the preheating zone at a temperature of about 250° C. to about 350° C. Additional waste heat can be recovered from the off gases to remove excess moisture content in the sediments and soils before they are fed into the melter. Drying of wet feeds can be carried out in a separate piece of equipment (not shown in FIGS. 8, 9 and 10) at temperatures of about 55° C. to 95° C. in order to minimize the volatilization of chlorinated and other hazardous compounds into the flue gas. If necessary, the flue gas can be scrubbed before it is vented into the atmosphere.

One of the advantageous features of the above process is that the counterflow preheating of the charge material becomes an inherent part of the melting process. The upward flowing hot gases come into intimate contact with the descending burden, allowing direct and efficient heat exchange to take place.

Due to the emissions emerging from a cupola melting furnace, at some locations where the air emission regulations are more stringent, natural gas can be used as fuel to replace coke in a natural gas-fired melting furnace. Another reason for using natural gas can result from the ash contamination caused by the coke or coal used in the cupola.

Figure 9:
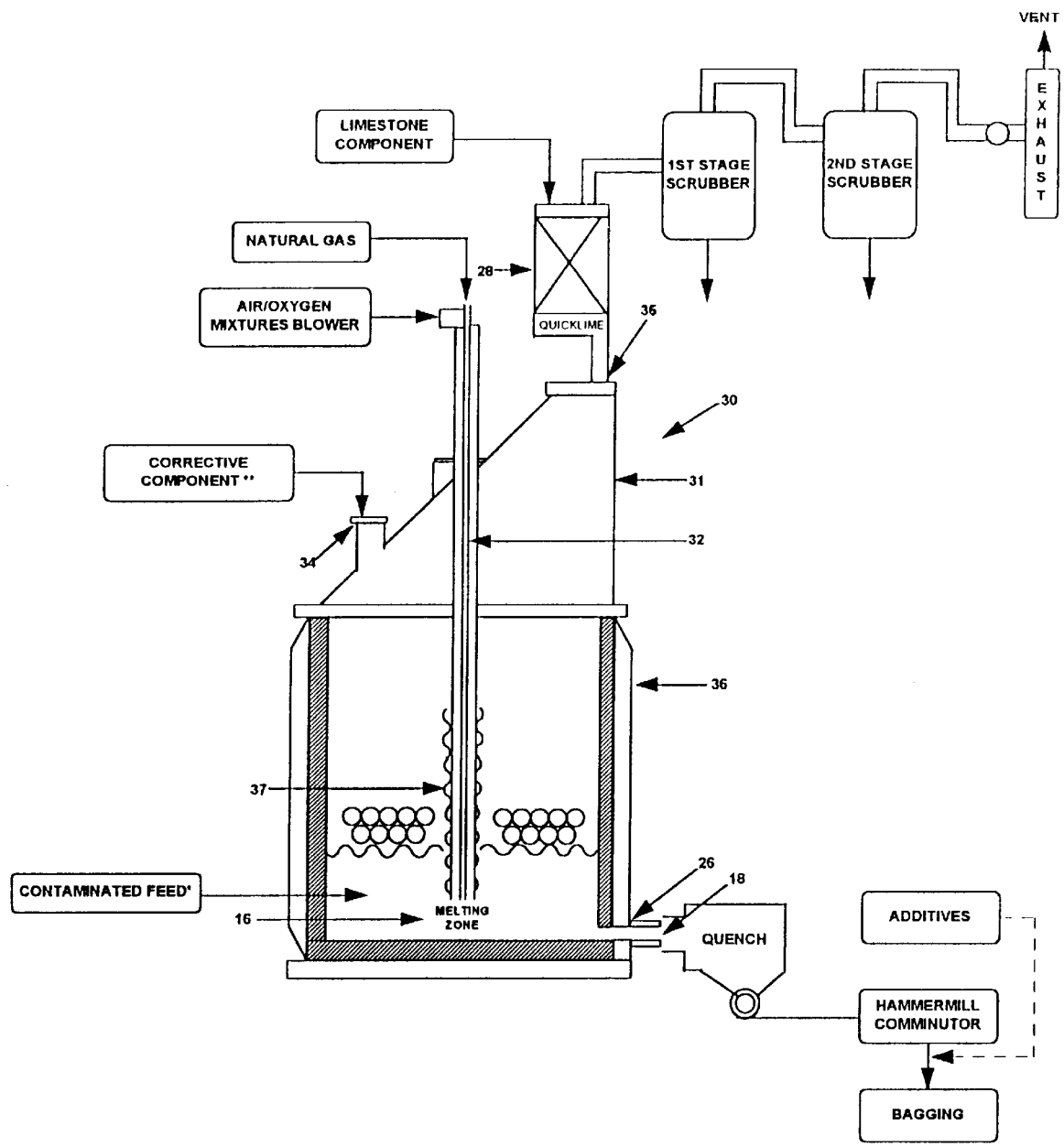
FIG. 9 is a schematic showing the manufacture of reactive melt by the subject invention using a natural-gas-fired melting furnace.

As shown in FIG. 9, a natural gas-fired melting furnace 30 consists of a water-cooled, refractory-lined vertical, cylindrical steel vessel 31 and a nonconsumable hollow steel lance 32. The furnace 30 is also equipped with feed ports 34 and 35 and gas exit 35 at upper levels and tap hole 18 slightly above the bottom of the furnace. The outer surfaces of the furnace wall and bottom is chilled with a stream of water flowing in the cooled jacket 36.

Additive components (includes alumina, bauxite, ferric oxide and fluxing agent) and quicklime are gravity fed through the feed ports 34 and 35. The lance 32 injects natural gas (or fuel oil) and an excess amount of oxygen mixture or air into the vessel 30. The mechanism by which melting is accomplished in the melting furnace is heat release by combustion of natural gas and oxygen:

$$CH_4 + 2O_2 \rightarrow CO_2 + 2H_2O \Delta H = -192 \text{ kcal/mole}$$

A protective coating of frozen slag 37 makes the lance nonconsumable. For normal operation, the lance tip is submerged into the molten bath 16 in order to provide proper mixing and achieve high thermal destruction and removal efficiencies of the organic contaminants.

Figure 10:
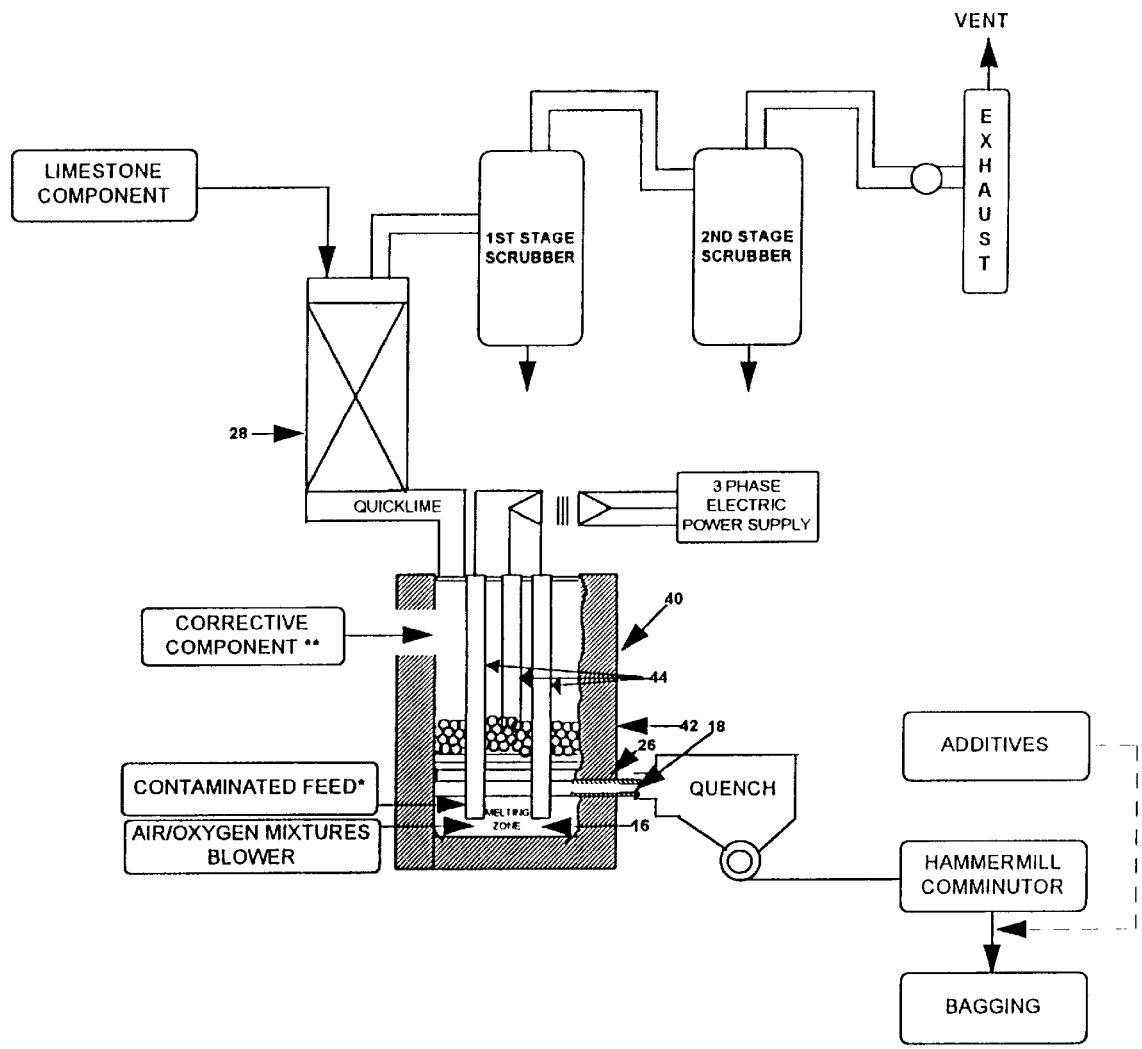
FIG. 10 is a schematic showing the manufacture of reactive melt by the subject invention using an electric melting furnace.

Alternatively, as shown in FIG. 10, an electric melting furnace 40 can be used to achieve the same purpose. An electric melting furnace 40 continuously melts the feed materials used for reactive melt manufacturing and including a refractory lined furnace vessel 42. A plurality of electrodes 44 extending into the furnace vessel from its side or top is illustrated schematically in FIG. 10. Each one of the electrodes 44 can be moved into the melt bath 16 or away from it in millimeter increments by a worm drive mechanism (not shown) so as to adjust to a certain immersion depth. For obtaining a high melting performance, the electric melting furnace is designed as a 3-phase alternating current furnace. The introduction of energy can be effected by resistance heat.

The immersion depths of the electrodes 44 are adjusted for constant performance, with the electrodes being individually controlled. The heat from the electrodes 44 melts the feed materials including the waste materials at a temperature of about 1150° C. to 1500° C. and molten reactive melt of substantially uniform composition is formed as a result of the liquid phase oxide reactions. The molten reactive melt from a hotter region below the surface is continuously withdrawn from the furnace vessel through tapping device 26. The location of the tapping device is preferred to be slightly above the bottom of the furnace vessel.

The temperature range of the combustion zone in an electric melting furnace or a natural gas fired melting furnace is similar to that in a cupola, starting from the melting temperature to about 1000° C. The residence time between about 0.5 to 4 seconds of the flue gas generated in the heating step is useful to enable high thermal destruction of organic contaminants in the combustion zone. Similar to the cupola, the limestone to quicklime reaction can also be conducted in a separate piece of equipment 28 (e.g., a vertical shaft kiln). The hot gases from the combustion zone will provide the energy required for the limestone decomposition and the hot quicklime is being charged continuously into the melting furnace.

$$CaCO_3 \rightarrow CO_2 + CaO \Delta H = 42.82 \text{ kcal/mole}$$

The quicklime vertical shaft kiln 28 can be fired by fuel oil or natural gas, if additional energy is required.

The molten reactive melt through the outlets 18 of the cupola; the electric melting furnace; or the natural gas fired melting furnace is generally kept at a temperature exceeding about 1300° C. The melt is rapidly quenched in moist air, steam or water to prevent crystallization and enhance heavy metal incorporation. The quenched melt is then pulverized to yield the product, a reactive melt, which can then be mixed with portland cement or other cements for the production of blended cements. The quenched melt may be pulverized to a particle size in the longest dimension of 1–100 microns, and preferably a particle size of 5–40 microns to obtain a quicker setting of the resulting blended cement.

A contemplated process utilizes a feed material, without preprocessing requirements such as dewatering and sizing, of all types of contaminated estuarine, river, ocean, or lake sediments and contaminated soils (sand, clay, or shale). Contaminated sediments and soils are fed either to the melting zone or the combustion zone of the furnaces depending on the nature and type of the contaminants; where the organic contaminants-depleted sediments and soils plus proper amounts of lime, metal oxides and fluxing agent are incorporated into the melt and thus form the subsequent reactive melt.

Because of the presence of calcium in the melt, no HCl, chlorine or $SO_x$ could be formed. Chlorine (if any) or chlorine compounds, $SO_x$ (if any) and $NO_x$ in the off gas are typically scrubbed or washed. Highly volatile heavy metals such as mercury and arsenic may be removed from the off gas by a simple in-line bag-type filter or activated carbon or silver or sulfur impregnated activated carbon. Volatilized compounds of sodium, potassium and phosphorus in the off gas are scrubbed and removed. Entrained nonvolatile heavy metals in the off gas are also scrubbed and returned to the melting zone for incorporation pursuant to the subject invention.

All of the melting furnaces suggested are very suitable for using shredded scrap tire as waste feed material and energy sources as these furnaces operate at very high temperatures and have long residence times. The furnace temperatures typically exceed about 1300° C. (2372° F.). High temperatures, long residence times and an adequate supply of oxygen ensure complete burnout of organics, which precludes the subsequent formation of dioxins and furans, a primary consideration in solid waste combustion.

In addition, the reactive melt production process of the subject invention can utilize the iron contained in the steel beads and belts of tires. The steel does not change the quality of the reactive melt product, because large quantities of iron compound are already present as one of the main ingredients. In some cases, when insufficient iron compound is present in the feed materials, the iron contained in steel-belted tires can help to improve the properties of the final reactive melt product. The sulfur contained in the tires reacts with the limestone to form gypsum which is also one of the ingredients needed for reactive melt production. This reaction also alleviates concerns about the $SO_x$ air emission problem from sulfur in the rubber tires.

In general, burning scrap tires in the furnace can improve furnace performance, reduce natural gas requirements and achieve more stable operations due to the higher energy content and more uniform composition of tires. When ash contamination is not a problem and the air emission levels are properly monitored, shredded scrap tires can be added to the feed materials to reduce fuel and electric power consumption. This can be important when the feed is wet as in the case of estuarine sediments.

While the invention has been described with reference to a preferred embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best modes contemplated for carrying out this invention, but that the invention includes all embodiments and equivalents falling within the scope of the appended claims.

Various features of the invention are set forth in the following claims.

What is claimed:

1. An environmentally stable substantially non-leaching cement product of a process for thermo-chemical remediation and decontamination of sediments and soils contaminated with organic materials as well as inorganic contaminants and heavy metals, the process comprising the steps of:
    a) blending said contaminated sediments or soils with a calcium oxide source, alumina, ferric oxides and fluxing agent to form a mixture;
    b) heating the mixture above the melting temperature of said mixture to produce a completely molten homogeneous reaction product;
    c) bubbling oxygen through the molten reaction product for destruction of said organic contaminants;
    d) quenching the reaction product in the presence of moist air, steam or water to form a reactive amorphous material having a silicate network, and thereby incorporating inorganic contaminants and heavy metals within the silicate network;
    e) pulverizing the reactive amorphous material to form a reactive cementitious powder having a molar acidity of about 1.0 to about 2.5;
    f) blending the cementitious powder with cement to yield a stable blended cement which leaches less than 0.01 mg/L, of Cd, and less than 0.05 mg/L of Pb.

2. The product of claim 1, wherein said fluxing agent is calcium fluoride.

3. A generally homogeneous non-leaching reactive cementitious melt product which is amorphous and comprising: calcium oxide (CaO), about 20 to 40 wt %; silica ($SiO_2$), about 45 to 65 wt %; alumina ($Al_2O_3$), about 5 to 20 wt %; ferric oxide ($Fe_2O_3$), about 2 to 10 wt %; and fluxing agent, said melt product leaching less that 0.01 mg/L of Cd, and less than 0.05 mg/L of Pb.

4. The reactive melt product of claim 3, further including minor chemical components of magnesia (MgO), alkalis ($Na_2O$ and $K_2O$), sulfur trioxide ($SO_3$) present as gypsum, halogens present as halogenated inorganics, phosphorus oxide ($P_2O_5$), titanium oxide ($TiO_2$) and strontium oxide (SrO).

5. The reactive melt product of claim 3, wherein the melting point of the reactive melt is between the temperatures of about 1150° to about 1400° C.

6. The reactive melt product of claim 3 further mixed with 2.75 parts of sand and 0.484 part of 20 wt % NaOH aqueous solution for every one part of the reactive melt product, to yield a mortar with high compressive strength greater than 21.4 Mpa.

7. The reactive melt product of claim 3 further blended with portland cement to yield a blended cement.

8. The reactive melt product of claim 3, wherein heavy metals are incorporated in a silicate network within the reactive melt product.

9. A blended cement comprising a mixture of portland cement and a reactive melt product, said reactive melt product is a generally homogeneous amorphous non-leaching cementitious melt product comprising CaO, $SiO_2$, $Al_2O_3$, $Fe_2O_3$ and $CaF_2$, the weight ratio of reactive melt product to portland cement being from about 10 parts of reactive melt product to about 90 parts of portland cement up to about 70 parts of reactive melt product to about 30 parts of portland cement, said melt product leaching less than 0.01 mg/L of Cd, and less than 0.05 mg/L of Pb.

10. The blended cement of claim 9, wherein the reactive melt product component consumes hydrated lime present in said portland cement.

11. The blended cement of claim 9, wherein said reactive melt product has the composition of: calcium oxide (CaO), about 20 to 40 wt %; silica ($SiO_2$), about 45 to 65 wt %; alumina ($Al_2O_3$), about 5 to 20 wt %; ferric oxide ($Fe_2O_3$), about 2 to 10 wt %; and fluxing agent, about 0 to 5 wt %.

* * * * *

UNITED STATES PATENT AND TRADEMARK OFFICE
CERTIFICATE OF CORRECTION

PATENT NO. : 5,855,666
DATED : January 5, 1999
INVENTOR(S) : Kao et al.

It is certified that error appears in the above-identified patent and that said Letters Patent is hereby corrected as shown below:

On the title page, item[54] and column 1, should read:

"Environmentally Stable Products Derived From the Remediation of Contaminated Sediments and Soils."

In Column 3, line 31, delete "SiO" and insert --$SiO_2$--.

In Column 5, line 24, delete "the calculating" and insert --calculating the--.

In Column 5, line 41, delete "bu" and insert --by--.

In Column 6, Table 3, delete "IPIP" and insert --IP/P--.

In Column 10, line 34, delete ", in which" and insert --.--.

In Column 13, line 20, delete ";" and insert --,--.

UNITED STATES PATENT AND TRADEMARK OFFICE
CERTIFICATE OF CORRECTION

PATENT NO. : 5,855,666
DATED : January 5, 1999
INVENTOR(S) : Kao et al.

It is certified that error appears in the above-identified patent and that said Letters Patent is hereby corrected as shown below:

IN THE CLAIMS:

Please amend claims 3, 6, and 11 as follows:

In Claim 3, column 14, line 47, delete "that" and insert --than--.

In Caim 6, column 14, line 62, delete "Mpa" and insert --MPa--.

In Claim 11, column 16, line 8 delete "fluxing agent" and insert --$CaF_2$--.

IN THE ABSTRACT:

In line 8, delete "~" and insert --to--.

Signed and Sealed this

Sixth Day of July, 1999

Attest:

Q. TODD DICKINSON

*Attesting Officer*   *Acting Commissioner of Patents and Trademarks*